May 22, 1956   E. P. KUHLMANN   2,746,304
RECORD MATERIAL CARRIAGE SHIFTING MEANS FOR CALCULATING MACHINES
Filed June 28, 1951   4 Sheets-Sheet 2

INVENTOR
EMIL P. KUHLMANN
BY *Karl Bernst*
HIS ATTORNEY

May 22, 1956 E. P. KUHLMANN 2,746,304
RECORD MATERIAL CARRIAGE SHIFTING MEANS FOR CALCULATING MACHINES
Filed June 28, 1951 4 Sheets-Sheet 3

INVENTOR
EMIL P. KUHLMANN
BY Earl Benst
HIS ATTORNEY

May 22, 1956  E. P. KUHLMANN  2,746,304
RECORD MATERIAL CARRIAGE SHIFTING MEANS FOR CALCULATING MACHINES
Filed June 28, 1951  4 Sheets-Sheet 4

INVENTOR
EMIL P. KUHLMANN

BY Karl Benst

HIS ATTORNEY

United States Patent Office 2,746,304
Patented May 22, 1956

2,746,304

RECORD MATERIAL CARRIAGE SHIFTING MEANS FOR CALCULATING MACHINES

Emil P. Kuhlmann, Schwaben, Bavaria, Germany, assignor to National Registrier Kassen Augsburg G. m. b. H., Augsburg, Germany, a joint-stock company of Germany Application June 28, 1951, Serial No. 234,065

2 Claims. (Cl. 74—99)

This invention relates to a mechanism for alternately shifting a record material carriage from a neutral position to two columnar positions, the carriage being moved to one columnar position on one cycle of machine operation and to the other columnar position on the next cycle of machine operation.

One type of operation commonly carried out on such machines requires the printing of amounts or numbers on the same line in different columns in successive machine operations, with or without entry into a totalizer, and this necessitates that the carriage be shuttled for each entry either to the left or to the right, the platen being line-spaced after alternate entries. Such a procedure is employed where a figure or number is to be printed in a left-hand column of the record material without entry into a totalizer, and a related amount, on the same line, in an adjacent right-hand column and which is entered into a totalizer, the carriage being shuttled between the columnar positions at the successive machine operations, and the platen line-spaced as the carriage returns to the left-hand columnar position after the operations have been effected in respect of the right-hand column.

Arrangements are known in which the carriage is automatically shuttled between the two columns during the machine operations and the platen line-spaced at alternate operations. In these known arrangements, the printing operation is effected whilst the carriage is stationary and is followed by the tabulating movement, and, thus, only a portion of the machine cycle is available for the complete tabulating movement to take place which, in view of the mass of the carriage, requires rapid acceleration, and, in consequence, the provision of efficient braking and damping mechanism to absorb the momentum of the carriage at the termination of the tabular movements.

The present invention has particularly for its object improvements in such arrangements wherein the tabulating movements take place over a full cycle of the machine operation, and also permits the carriage to be moved continuously through the tabulating positions which eliminates the necessity for damping mechanism.

According to the present invention, a calculating or similar accounting machine includes a travelling record material carriage, a main operating mechanism, a group of printing elements normally disposed midway between tabular positions of the carriage, and a carriage shuttling mechanism which is adapted to move the carriage to either of the two tabulating positions and back to the normal mid-position during a machine cycle, the printing operation being timed to take place at approximately mid-cycle.

The movement is preferably derived from a rotating member which is rotated through 180 degrees in a continuous direction from the main operating member of the machine at each machine cycle, and during one half cycle causes the carriage to be moved from the resting mid-position to one tabular position and returned, and conversely during the opposite half cycle.

The above and other subsidiary features of the present invention as applied, by way of example only, to one manner of carrying it into effect, will now be described, and are illustrated in the accompanying drawings.

The machine to which the present invention is shown as applied, by way of example only, is of a well-known type of adding machine, such as disclosed, for instance, in United States Patent No. 2,428,084 of September 30, 1947, to Harry L. Lambert and in application Serial No. 586,359, filed April 3, 1945, by Harry L. Lambert, and which issued as United States Patent No. 2,562,049, on July 24, 1951, and only a brief reference will be made herein to such of the known mechanisms as is necessary to an understanding of the present invention.

In general, the machine comprises a keyboard, an upper and a lower totalizer, control devices for selectively controlling the totalizers to perform additive, subtractive, non-additive, sub-total-taking, and total-taking operations, a printing mechanism, and a record material carriage which is normally arranged to be moved manually into, and out of, any desired columnar position, in certain types of machine operations.

Figure 1:
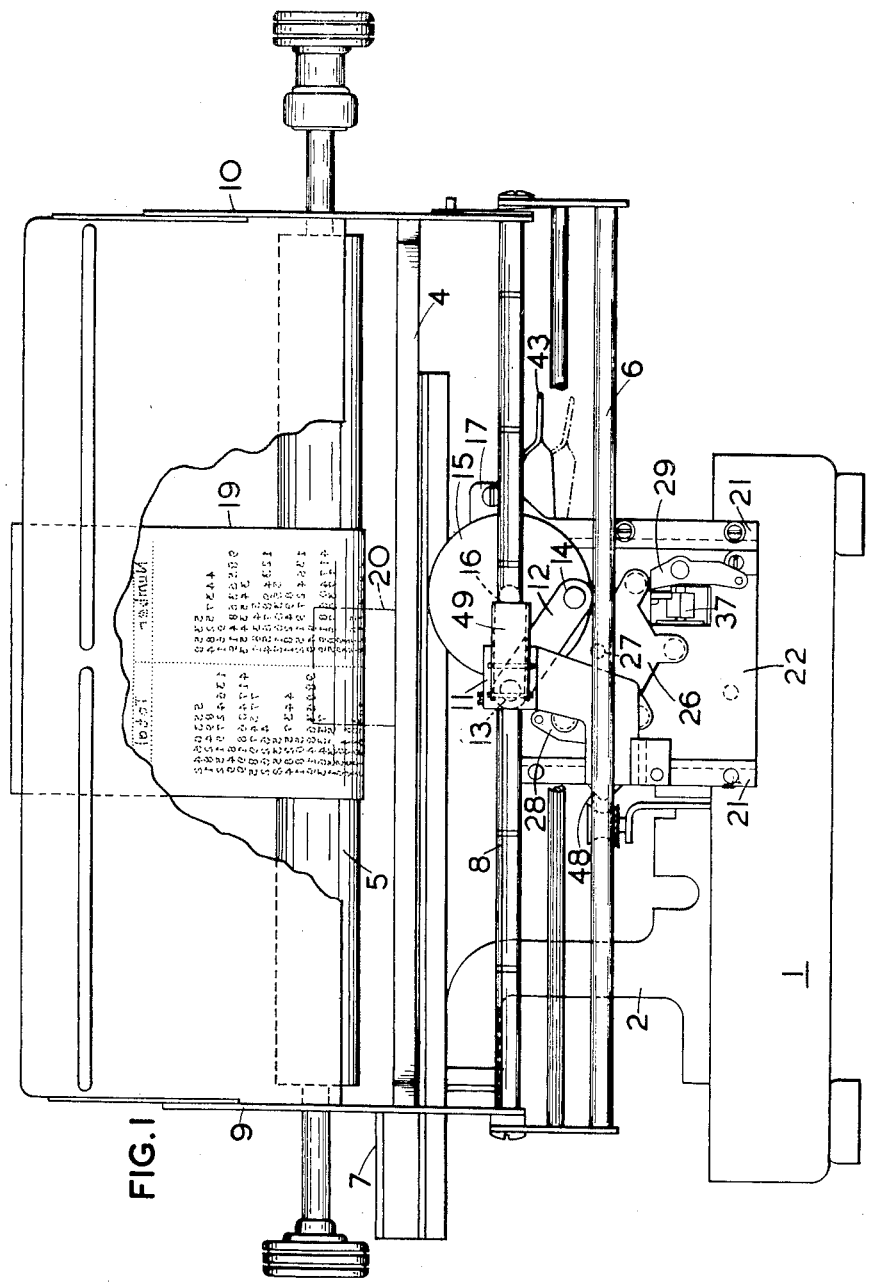
Fig. 1 is a rear elevation of the carriage of an adding machine embodying the invention.

Referring to the drawings, and more particularly to Fig. 1, it will be seen that the machine includes a base 1 supporting a frame 2 within which is journalled a main cam shaft 3 (Figs. 2 to 5) adapted to be oscillated in known manner at each machine operation.

The main cam shaft 3 oscillates through an angle of 75 degrees and back to normal, and the printing operation takes place approximately at or near to the end of the operating stroke by means of printer mechanism (not shown).

A record material carriage 4 supports a platen 5 which is adapted to be line-spaced under control of a feed bail 6, which in turn is reciprocated when line-spacing is required, the carriage 4 moving to and fro along a guide 7.

A crossbar 8, maintained in position by means of side plates 9, 10 of the carriage 4, has adjustably mounted thereon a bracket 11 to which one end of a connecting link 12 is pivoted at 13. The other end of the link 12 is pivoted at 14 to a rotary disc 15, adjacent the periphery thereof, said disc being fast on one end of a stub shaft 16 supported in a plate 17 (see Figs. 2 to 5) which is detachably secured to the machine frame 2 by means of bolts 18.

The disposition of the components is such that when the disc 15 is positioned with the diameter thereof, on which the link 12 is pivoted, in the vertical, that is to say at a right angle to the line of carriage travel, the link lies at an angle to said diameter of between 45–55 degrees. The record material 19 containing the columns in which prints are to be made is positioned on the platen 5 of the travelling carriage 4 so that the printing elements 20 lie substantially midway between the columns, as shown in Fig. 1.

The disc 15 is adapted to be rotated 180 degrees at each machine cycle, and during this movement the movement of the pivot 14 of the link 12 connected to the disc 15 will be communicated to the link 12 so that during a first 180 degree movement from the position shown in Fig. 1 the carriage 4 will be moved correspondingly to one columnar position and back to mid-position, and in the following 180 degree movement will be moved to the other columnar position and back to mid-position.

The plate 17 is provided with a pair of guideways 21 on its outer face and these serve to locate a slide 22 which is adapted to reciprocate therein, such movement being brought about by means which will be described hereinafter.

Figure 2:
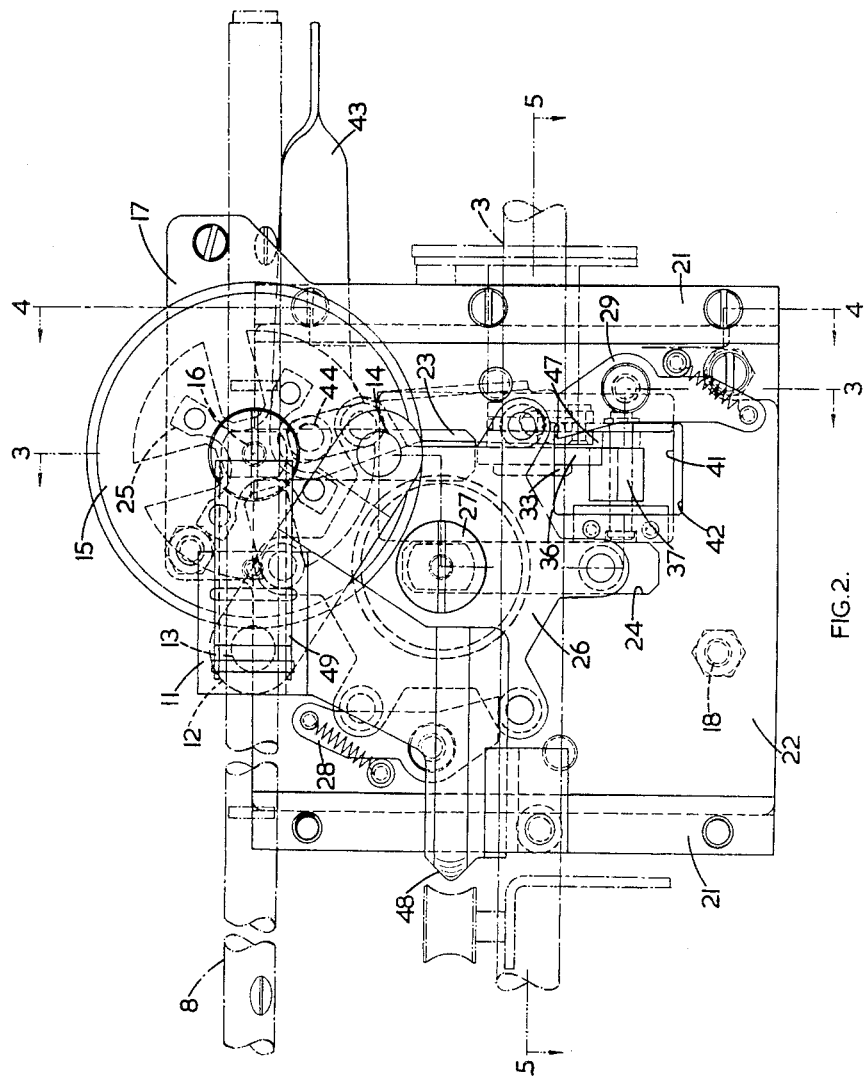
Fig. 2 is a detail view of the shuttle mechanism.
Figure 3:
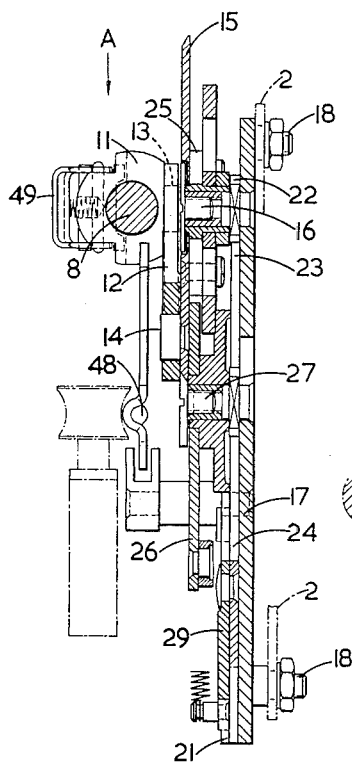
Fig. 3 is a vertical section taken on the line 3—3 of Fig. 2.
Figure 4:
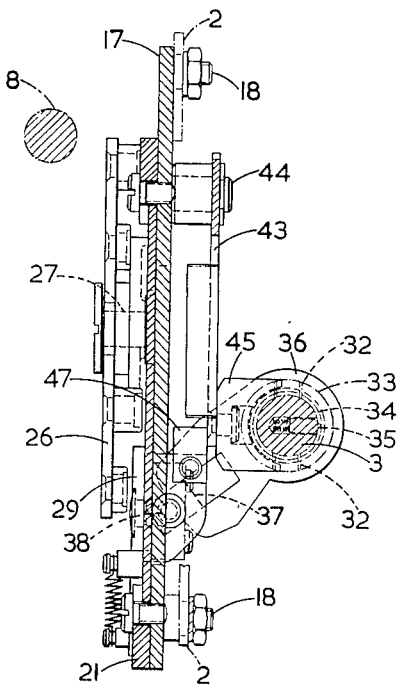
Fig. 4 is a vertical section taken on the line 4—4 of Fig. 2.
Figure 5:
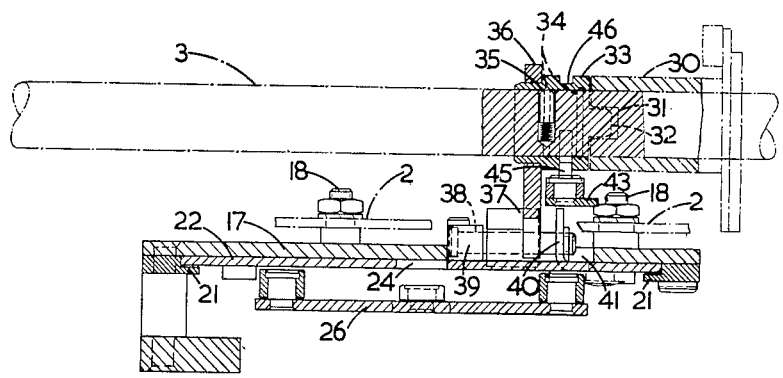
Fig. 5 is a sectional plan taken on the line 5—5 of Fig. 2.
Figure 6:
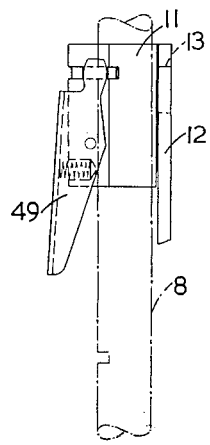
Fig. 6 is a detail view in the direction of the arrow "A" in Fig. 3.

Referring more particularly to Figs. 2 and 3, it will be seen that the slide 22 is provided with a pair of vertical slots 23 and 24, the purpose of the former being to provide a guideway for the stub shaft 16 when the slide 22 is reciprocated.

A four-toothed Geneva wheel 25 is co-axially mounted on the stub shaft 16 between the disc 15 and the plate 17, and is engaged by the teeth of a spider 26 mounted on a second stub shaft 27 also carried by the plate 17, the gearing being such that one pitch of movement of the spider wheel 26 brings about a 90 degree revolution of the disc 15, the shaft 27 working in the vertical slot 24 when the slide 22 is reciprocated.

The outer face of the slide 22 is provided with a pair of half-stroke pawls 28, 29, the former of which engages the spider 26 to move it one pitch on the operating movement of said slide 22, and the latter of which engages the spider to effect another pitch movement on the return of said slide, both of the pawls 28, 29 being arranged as by-pass pawls to enable either to be by-passed by the teeth of the spider 26 during rotation by the other pawl.

A sleeve 30 (see Fig. 5) fast on the main cam shaft 3 of the machine is provided with a pair of recesses 31 on one end thereof each of which serve to accommodate one of a pair of dogs 32 formed on the end of a clutch member 33 slidably mounted on the main cam shaft 3.

The inner periphery of the clutch member 33 is provided with a pair of grooves 34 either of which cooperates with a spring-urged locking pin 35 carried by the main cam shaft and projecting from the periphery thereof, the arrangement permitting the clutch to be locked in either the engaged or disengaged position.

The clutch member 33 is also provided with a bifurcated lever 36 which engages a dog 37 of substantially square cross-section and which is mounted on a pin 38 journalled at one end in a block 39 carried by the inner face of the slide 22, and at the other in a portion 40 of said slide bent at right angles to the normal plane and arranged to project through an aperture 41 in the plate 17, the dog 37 being located slightly within the aperture 41 and a slot 42 formed in the slide.

Thus, as the slide 22 is reciprocated, during the corresponding movement of the main cam shaft 3, the slide is moved forth and back to cause the pawls 28, 29 to step the spider wheel 26 and hence the disc 15. A lever 43 pivoted on a stud 44 projecting from the rear face of the plate 17 is provided for engaging and disengaging the clutch, and said lever is provided on its lower end with a saddle portion 45 (see Figs. 4 and 5) which cooperates with a groove 46 (see Fig. 5) formed on the outer periphery of the clutch member 33. It will therefore be appreciated that if the clutch 33 is in engagement with the sleeve 30 and, due to the rigid connection between the lever 36, dog 37, and slide 22, shuttling of the carriage 4 is taking place, all that it is necessary for the operator to do to enable the machine to be used for straight listing operations with line-spacing between each entry, is to rock the lever 43 about its pivot point 44. This has the effect that the clutch is immediately disengaged and reciprocation of the slide 22 and hence the shuttling movement of the carriage immediately ceases.

The portion 40 of the slide also carries a block 47 (see Fig. 4) which serves to maintain the lower end of the clutch lever 43 in position and to counteract any resistance shown by the clutch member 33.

From the foregoing description it will be appreciated that when the clutch 33 is being oscillated by the main cam shaft 3 in each machine cycle, the Geneva gear mechanism, through the intermediary of the reversely acting reciprocating pawls 28, 29, is caused to rotate 90 degrees during the operating movement of the main driving shaft 3, and a further 90 degrees movement on the restoration of said shaft, thus imparting a 180 degree movement to the disc 15 and achieving a shuttle movement of the carriage.

As before stated, spacing of the platen 5 is not required to take place following printing in the first column, but only after the printing operation in the second column has been effected. In the machine of the kind hereinbefore referred to, the spacing is effected by means of a lever which is caused to follow a cam secured to the oscillating main cam shaft of the machine, the lever, during its return movement, operating a bail carried by the carriage, the bail, in turn, operating a line-spacing pawl co-operating with a ratchet secured to the platen, to line-space the latter.

However, when the present invention is adapted for use in such machines, the bracket 11 to which the connecting link 12 is pivoted, and which is mounted on the crossbar 8 of the machine, is provided with a nose 48 (see Figs. 1 to 3) which, when the carriage 4 is in the left-hand columnar position, blocks the lever (not shown) from following the cam so that line-spacing cannot occur, whereas the nose 48 moves away from the lever, to permit line-spacing, when the carriage 4 is in the right-hand tabular position, said bracket 11 being provided with a spring biased lever 49 (see Figs. 1 to 3 and 6) for adjustably locking it in the desired position on the crossbar 8.

What is claimed is:

1. In a calculating machine having a main operating means for giving the machine cycles of operation, including a shaft which rocks one way during the first half and then the other way during the second half of a machine cycle, a record material carriage slidably mounted so that record material may be positioned with reference to a printing station, the combination of rotating means, including a disc and a four-toothed Geneva gear coupled thereto; a rotatable spider geared to the Geneva gear; a plate having mounted thereon a pair of by-pass pawls, said plate being coupled to and reciprocated back and forth by the rocking of the shaft, one pawl acting to drive the spider, which in turn drives the Geneva gear 90 degrees on the first half of the rocking of the shaft during a machine cycle and the other pawl acting to drive the spider further, which in turn drives the Geneva gear in the same direction another 90 degrees in the second half of the rocking of the shaft in said cycle; and a connecting link pivoted to the carriage and to a point on the disc, that point when the machine is at rest being on the radius of the disc that is at right angles to the line of carriage travel, whereby the carriage on one machine operation is moved from its normal rest position in one direction and back, and on the succeeding operation is moved from its normal rest position in the other direction and back, the carriage being at rest at mid-cycle, moving away from rest position to mid-cycle position with decreasing velocity, and moving from mid-cycle position to rest position with increasing velocity.

2. In a calculating machine having a main operating means for giving the machine cycles of operation, including a shaft which rocks one way during the first half and then the other way during the second half of the machine cycle, a record material carriage, slidably mounted so that record material may be positioned with reference to a printing station, the combination of rotating means, including a disc and a four-toothed Geneva gear coupled thereto; a rotatable spider geared to the Geneva gear; a plate having mounted thereon a pair of by-pass pawls, said plate being coupled to and reciprocated back and forth by the rocking of the shaft, one pawl acting to drive the spider, which in turn drives the Geneva gear 90 degrees on the first half of the rocking of the shaft during a machine cycle, and the other pawl acting to drive the spider further, which in turn drives the Geneva gear in the same direction another 90 degrees in the second half of the rocking of the shaft in said cycle; a clutch operable to uncouple the shaft from the pawls; and a connecting link pivoted to the carriage and to a point on the disc, that point when the machine is at rest being on the radius of the disc that is at right angles to the line of carriage travel, whereby the carriage on one machine operation is moved from its normal rest position in one direction, and back, and on the succeeding operation is moved from its normal rest position in the other direction and back, the carriage being at rest in mid-cycle, moving away from rest position to mid-cycle position with decreasing velocity, and moving from mid-cycle position to rest position with increasing velocity.

References Cited in the file of this patent

UNITED STATES PATENTS

| | | |
|---|---|---|
| 226,359 | Schurmann | Apr. 6, 1880 |
| 514,356 | Frichette | Feb. 6, 1894 |
| 924,118 | Vincent | June 8, 1909 |
| 980,652 | Mallmann | Jan. 3, 1911 |
| 1,019,231 | Dudley | Mar. 5, 1912 |
| 1,084,591 | Benner | Jan. 13, 1914 |
| 1,203,913 | Schafer | Nov. 7, 1916 |
| 1,582,830 | Landsiedel | Apr. 27, 1926 |
| 2,025,433 | Bolagek | Dec. 24, 1935 |
| 2,080,516 | Theurer | May 18, 1937 |